(12) United States Patent
Iwahara et al.

(10) Patent No.: US 8,555,469 B2
(45) Date of Patent: Oct. 15, 2013

(54) CLIP

(75) Inventors: Toshio Iwahara, Okazaki (JP); Kazuki Fujii, Okazaki (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 217 days.

(21) Appl. No.: 12/893,818

(22) Filed: Sep. 29, 2010

(65) Prior Publication Data

US 2011/0072624 A1   Mar. 31, 2011

(30) Foreign Application Priority Data

Sep. 30, 2009   (JP) ................................ 2009-226609

(51) Int. Cl.
   *F16B 2/20*   (2006.01)
(52) U.S. Cl.
   USPC ............................... 24/458; 24/297; 411/508
(58) Field of Classification Search
   USPC ............... 24/297, 458, 581.11; 296/108, 214;
   411/507–510
   See application file for complete search history.

(56) References Cited

U.S. PATENT DOCUMENTS

| | | | | |
|---|---|---|---|---|
| 3,177,540 | A * | 4/1965 | Hall et al. | 411/508 |
| 3,230,592 | A * | 1/1966 | Hosea | 24/297 |
| 3,485,133 | A * | 12/1969 | Rapata | 411/508 |
| 3,678,797 | A * | 7/1972 | Seckerson | 411/509 |
| 3,745,612 | A * | 7/1973 | Seckerson | 411/509 |
| 3,776,495 | A * | 12/1973 | Hartz et al. | 248/71 |
| 4,987,656 | A * | 1/1991 | Sato | 24/297 |
| 5,319,839 | A * | 6/1994 | Shimajiri | 24/453 |
| 5,573,362 | A | 11/1996 | Asami et al. | |
| 5,592,719 | A * | 1/1997 | Eto et al. | 24/453 |
| 5,658,110 | A * | 8/1997 | Kraus | 411/510 |
| 5,704,753 | A | 1/1998 | Ueno | |
| 6,305,055 | B1 * | 10/2001 | Castro | 24/458 |
| 6,572,317 | B2 * | 6/2003 | Okada et al. | 411/508 |
| 6,974,292 | B2 * | 12/2005 | Hansen | 411/508 |
| 7,967,539 | B2 * | 6/2011 | Huet | 411/508 |
| 2002/0028123 | A1 * | 3/2002 | Miura et al. | 411/508 |
| 2002/0106261 | A1 * | 8/2002 | Nakanishi | 411/508 |
| 2005/0095084 | A1 | 5/2005 | Hansen | |
| 2009/0188086 | A1 * | 7/2009 | Okada et al. | 24/297 |
| 2009/0265900 | A1 * | 10/2009 | Okada et al. | 24/458 |
| 2010/0322743 | A1 * | 12/2010 | Ostergren | 411/508 |

FOREIGN PATENT DOCUMENTS

| | | |
|---|---|---|
| DE | 1 211 032 | 2/1996 |
| EP | 1 895 171 A2 | 3/2008 |
| JP | 2001-355619 A | 12/2001 |
| JP | 2002-81422 | 3/2002 |

* cited by examiner

*Primary Examiner* — Robert J Sandy
*Assistant Examiner* — Rowland D Do
(74) *Attorney, Agent, or Firm* — Christensen Fonder P.A.

(57) ABSTRACT

A clip may include an anchor portion having a plurality of flexible strips and at least one support strip. Each of the flexible strips is integrally connected to the at least one support strip only via a connecting portion corresponding to a distal end portion of the anchor portion and a connecting portion corresponding to a proximal end portion of the anchor portion. When the anchor portion is pushed into an insertion hole formed in a subject member, the anchor portion is inserted into the insertion hole while each of the flexible strips are flexed toward a longitudinal axis of the anchor portion. Each of the flexible strips is formed such that the difference between a second moment of area of the anchor distal end side connecting portion and a second moment of area of the anchor proximal end side connecting portion is 0-15%.

4 Claims, 5 Drawing Sheets

CLIP

This application claims priority to Japanese patent application serial number 2009-226609, the contents of which are incorporated herein by reference.

BACKGROUND OF THE INVENTION

1. Field of the Invention

The present invention relates to a clip that is attachable to a subject member (e.g., a vehicle body). More particularly, the present invention relates to a clip that is attachable to the subject member by inserting an anchor portion thereof into an insertion hole formed in the subject member.

2. Description of Related Art

This type of clip is already known and is taught, for example, by Japanese Laid-Open Patent Publication No. 2002-81422. The clip includes an anchor portion (an engagement portion) that is inserted into an insertion hole formed in a subject member. The anchor portion has a plurality of flexible strips. When the anchor portion is pushed into the insertion hole, the anchor portion is inserted into the insertion hole while each of the flexible strips are flexed inwardly, so that a projected portion (a shouldered portion) of each of the flexible strips can engage a periphery of the insertion hole. Thus, the clip can be attached to the subject member.

Generally, as shown in FIG. 7, each of the flexible strips 52 of the anchor portion 50 is integrally connected to a support strip 53 of the anchor portion 50 only via a connecting portion 52a corresponding to a distal end of the anchor portion 50 (an anchor distal end side connecting portion 52a) and a connecting portion 52b corresponding to a proximal end of the anchor portion 50 (an anchor proximal end side connecting portion 52b). Further, the distal end of the anchor portion 50 has a cone shape such that the anchor portion 50 can be easily pushed into the insertion hole 22 of the subject member 20. Therefore, the anchor distal end side connecting portion 52a of each of the flexible strips 52 is thinner than the anchor proximal end side connecting portion 52b of each of the flexible strips 52. That is, the anchor distal end side connecting portion 52a has a junction area (a second moment of area) smaller than the anchor proximal end side connecting portion 52b.

According to the clip in which the anchor distal end side connecting portion 52a is thinner than the proximal end side connecting portion 52b, as shown by broken lines in FIG. 7, the anchor distal end side connecting portion 52a can be widely flexed when the anchor portion 50 is pushed into the insertion hole 22. As a result, an angle θ between an axis of the insertion hole 22 (a longitudinal axis of the anchor portion 50) and an outer surface of each of the flexible strips 52 can be increased. This may lead to an increased insertion load (insertion resistance) in a last stage of an insertion operation of the clip. As a result, working efficiency of the clip insertion operation can be reduced.

Thus, there is a need in the art for improved clips.

SUMMARY OF THE INVENTION

For example, in one embodiment of the present invention, a clip may include an anchor portion having a plurality of flexible strips and at least one support strip. Each of the flexible strips is integrally connected to the at least one support strip only via a connecting portion corresponding to a distal end portion of the anchor portion and a connecting portion corresponding to a proximal end portion of the anchor portion. When the anchor portion is pushed into an insertion hole formed in a subject member, the anchor portion is inserted into the insertion hole while each of the flexible strips are flexed toward a longitudinal axis of the anchor portion, so that a shouldered portion of each of the flexible strips can engage a periphery of the insertion hole. Each of the flexible strips is formed such that the difference between a second moment of area of the anchor distal end side connecting portion and a second moment of area of the anchor proximal end side connecting portion is 0-15%.

According to this embodiment, when the anchor portion is pushed into the insertion hole formed in the subject member, the anchor distal end side connecting portion and the anchor proximal end side connecting portion of each of the flexible strips can be substantially uniformly flexed, so that each of the flexible strips can be deformed to be parallel to an axis of the insertion hole. Therefore, in a last stage of an insertion operation of the clip, an angle between the axis of the insertion hole and an outer surface of each of the flexible strips can be maintained in a substantially zero degree. Thus, an insertion load (insertion resistance) of the clip cannot substantially be increased. As a result, working efficiency of the clip insertion operation can be increased.

Optionally, the flexible strips may respectively be positioned circumferentially at equal intervals.

Further, the at least one support strip may includes a pair of support strips each having an L-shape in cross section that are positioned so as to be symmetrical about the longitudinal axis of the anchor portion.

Other objects, features and advantages of the present invention will be readily understood after reading the following detailed description together with the accompanying drawings and the claims.

DETAILED DESCRIPTION OF THE INVENTION

A detailed representative embodiment of the present invention will be described with reference to FIGS. 1 to 6.

Figure 1:
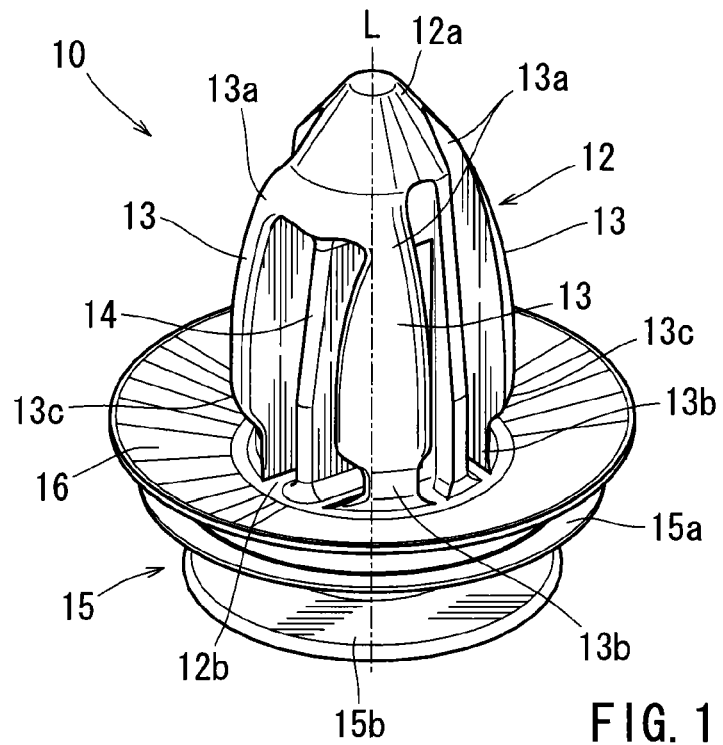
FIG. 1 is a perspective view of a clip according to a representative embodiment of the present invention.
Figure 2:
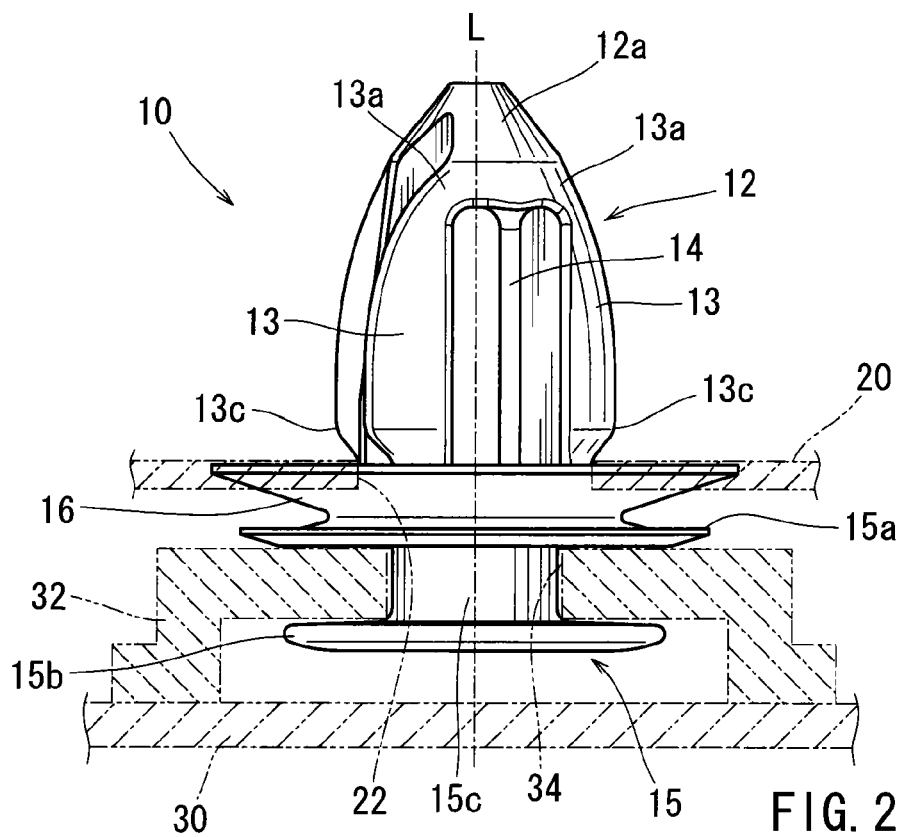
FIG. 2 is an elevational view of the clip, which view illustrates a condition in which the clip is attached to a subject member.

As shown in FIGS. 1 and 2, a representative clip 10 may preferably be integrally formed as a unit by molding of resin. The clip 10 may preferably include an upper anchor portion 12, a lower connecting portion 15, and a disk portion 16 that is positioned between the anchor portion 12 and the connecting portion 15.

The anchor portion 12 may preferably include a distal end portion 12a, and a proximal end portion 12b that is connected to the disk portion 16. The distal end portion 12a of the anchor portion 12 is formed into a cone-shaped solid portion (block).

Conversely, the proximal end portion 12b of the anchor portion 12 has substantial rigidity so as to function as a base portion of the clip 10.

The anchor portion 12 may further include a plurality of (four in this embodiment) vertical flexible strips 13 and at least one (two in this embodiment) vertical support strips 14. Each of the flexible strips 13 extends between the distal end portion 12a and the proximal end portion 12b and is connected thereto at both ends thereof. Conversely, each of the support strips 14 extends between the distal end portion 12a and the proximal end portion 12b and is connected thereto at both ends thereof. As a result, each of the flexible strips 13 is integrally connected to the corresponding support strip 14 at both ends thereof. Further, each of the flexible strips 13 is connected to the corresponding support strip 14 only via a connecting portion 13a corresponding to the distal end portion 12a of the anchor portion 12 (an anchor distal end side connecting portion 13a) and a connecting portion 13b corresponding to the proximal end portion 12b of the anchor portion 12 (an anchor proximal end side connecting portion 13b). Therefore, each of the flexible strips 13 can be flexed toward a longitudinal axis L of the anchor portion 12 due to elasticity thereof.

Figure 5:
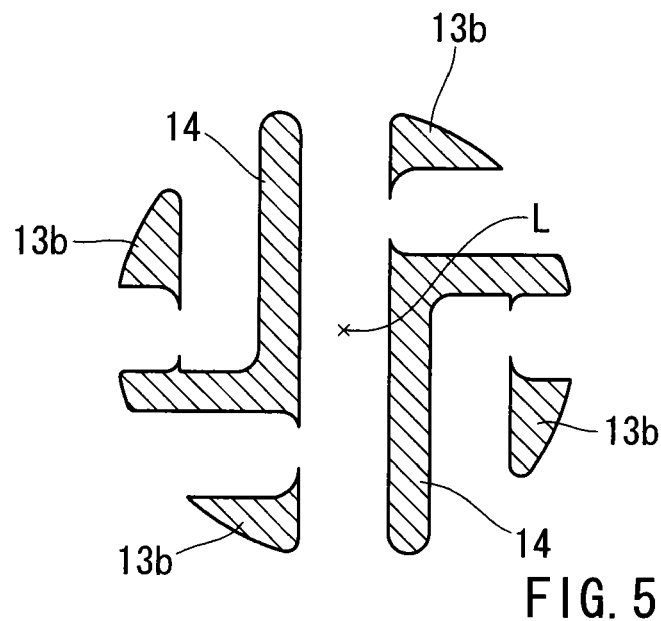
FIG. 5 is a cross-sectional view taken along line V-V of FIG. 4.
Figure 6:
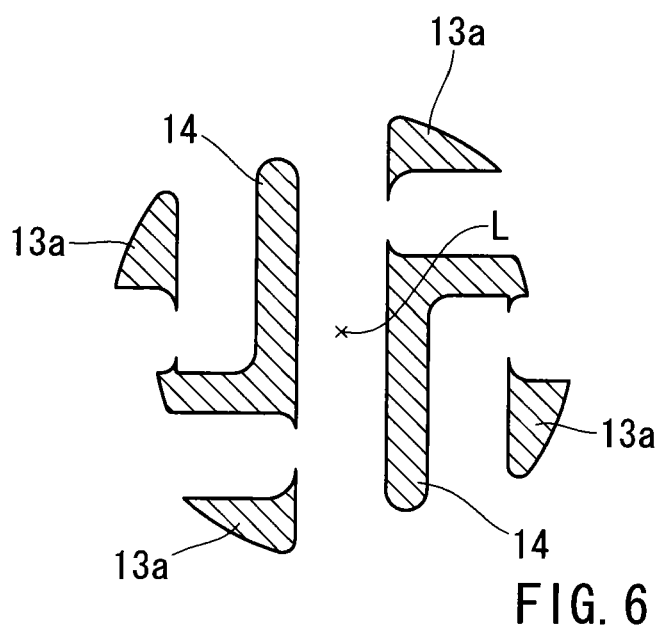
FIG. 6 is a cross-sectional view taken along line VI-VI of FIG. 4.
Figure 7:
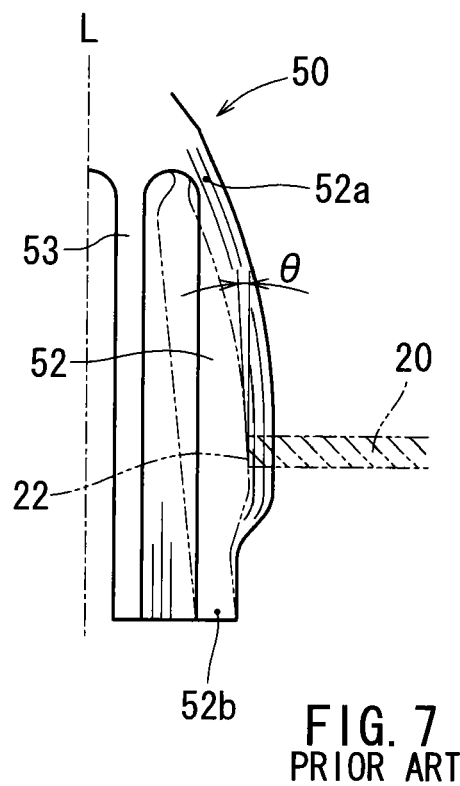
FIG. 7 is a partially sectional view of a conventional clip, which view illustrates a condition in which the clip is being inserted into an insertion hole of a subject member.

The flexible strips 13 are respectively positioned circumferentially at equal intervals (FIGS. 5 and 6). Also, as best shown in FIG. 2, each of the flexible strips 13 has an outwardly protruded shouldered portion 13c that is positioned adjacent to the proximal end portion 12b of the anchor portion 12. Conversely, the support strips 14 are respectively positioned so as to not interfere with the flexible strips 13 (FIGS. 5 and 6). Further, each of the support strips 14 has an L-shape in cross section (FIGS. 5 and 6). Also, the support strips 14 may preferably be positioned so as to be symmetrical about the longitudinal axis L of the anchor portion 12.

According to the clip 10 thus constructed, as shown in FIG. 2, when the anchor portion 12 is pushed into an insertion hole 22 formed in a subject member 20 (e.g., a door inner panel), the anchor portion 12 is inserted into the insertion hole 22 while each of the flexible strips 13 are flexed inwardly, so that a shouldered portion 13c of each of the flexible strips 13 can engage a periphery of the insertion hole 22. Thus, the clip 10 can be attached to the subject member 20.

The connecting portion 15 is formed to be continuous with the proximal end portion 12b of the anchor portion 12. The connecting portion 15 may preferably include an upper (first) flange 15a, a lower (second) flange 15b, and a circular cylindrical portion 15c. The circular cylindrical portion 15c is positioned between the upper and lower flanges 15a and 15b and has a reduced diameter. As shown in FIG. 2, the connecting portion 15 is used to attach the clip 10 to an attaching member 30 (e.g., a door trim).

As shown in FIG. 2, the attaching member 30 has an attachment portion 32 that is constructed to engage the connecting portion 15 of the clip 10. As will be appreciated, the attachment portion 32 is formed in an opposite surface (a rear surface) of a front (ornamental) surface of the attaching member 30. The attachment portion 32 has a slit 34 formed therein. Therefore, when the circular cylindrical portion 15c of the connecting portion 15 is pushed into the slit 34, the connecting portion 15 can be connected to the attachment portion 32 while the attachment portion 32 is interleaved between the upper and lower flanges 15a and 15b.

As best shown in FIG. 2, the disk portion 16 may preferably be formed as a circular dish-shaped portion. As best shown in FIG. 1, the dish-shaped disk portion 16 is positioned around the proximal end portion 12b of the anchor portion 12. The disk portion 16 is flared upwardly (diagonally extended upwardly and outwardly) and has a substantial or moderate flexibility. Further, the disk portion 16 is concentrically positioned about the longitudinal axis L of the anchor portion 12. As will be recognized, when the anchor portion 12 is pushed into the insertion hole 22 formed in the subject member 20 (which is shown in FIG. 2) in order to attach the clip 10 to the subject member 20, the disk portion 16 can be pressed to a (lower) surface of the subject member 20 around the insertion hole 22, so as to be elastically deformed. Thus, the clip 10 can be stably attached to the subject member 20. As will be recognized, the disk portion 16 has a stabilizing function that can stabilize the clip 10 on the subject member 20 when the clip 10 is attached to the subject member 20. In addition, the disk portion 16 can hermetically contact the surface of the subject member 20 when elastically deformed. That is, the disk portion 16 also has a sealing function that can prevent water from entering the insertion hole 22.

Further, as shown in FIGS. 5 and 6, in this embodiment, each of the flexible strips 13 of the anchor portion 12 is formed such that the anchor distal end side connecting portion 13a has the substantially same cross-sectional shape (fan shape) as the anchor proximal end side connecting portion 13b. In addition, each of the flexible strips 13 of the anchor portion 12 is formed such that the anchor distal end side connecting portion 13a has the same cross-sectional area as the anchor proximal end side connecting portion 13b. However, each of the flexible strips 13 of the anchor portion 12 can be formed such that the difference between a cross-sectional area of the anchor distal end side connecting portion 13a and a cross-sectional area of the anchor proximal end side connecting portion 13b does not exceed 15%. This means that each of the flexible strips 13 of the anchor portion 12 can be formed such that the difference between a junction area (a second moment of area) of the anchor distal end side connecting portion 13a and a junction area (a second moment of area) of the anchor proximal end side connecting portion 13b is 0-15%. Therefore, when each of the flexible strips 13 is applied with a load from outside (i.e., when the anchor portion 12 is pushed into the insertion hole 22 formed in the subject member 20), the anchor distal end side connecting portion 13a and the anchor proximal end side connecting portion 13b can be substantially uniformly flexed. As a result, as shown by broken lines in FIG. 3, an outer surface of each of the flexible strips 13 can be flexed so as to be parallel to the longitudinal axis L of the anchor portion 12 (an axis of the insertion hole 22).

Next, a method of using the resin clip 10 will now be described in detail.

First, as shown in FIG. 2, the connecting portion 15 of the clip 10 is pushed into the slit 34 formed in the attachment portion 32 of the attaching member 30, so as to be connected to the attachment portion 32. Subsequently, the anchor portion 12 of the clip 10 is inserted into the insertion hole 22 formed in the subject member 20. Upon insertion of the anchor portion 12, the anchor portion 12 passes through the insertion hole 22 while the flexible strips 13 of the anchor portion 12 are respectively flexed toward the longitudinal axis L of the anchor portion 12, so that the shouldered portions 13c of the flexible strips 13 can engage the circumferential periphery of the insertion hole 22. Thus, the resin clip 10 can be attached to the subject member 20. As a result, the attaching member 30 can be attached to the subject member 20 via the clip 10.

Figure 3:
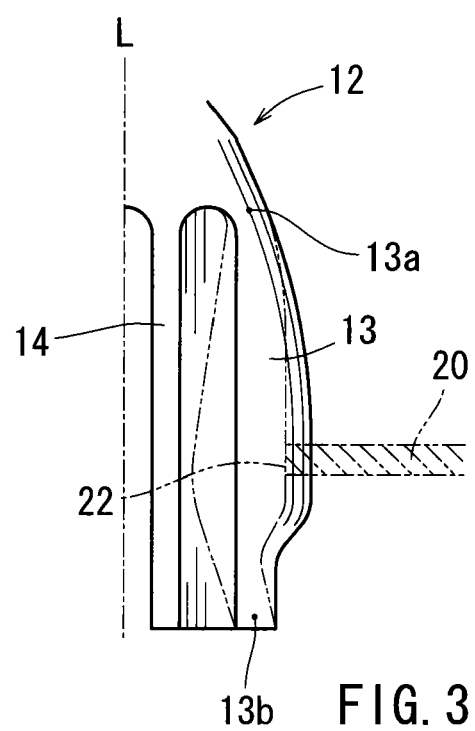
FIG. 3 is a partially sectional view of the clip, which view illustrates a condition in which the clip is being inserted into an insertion hole of the subject member.
Figure 4:
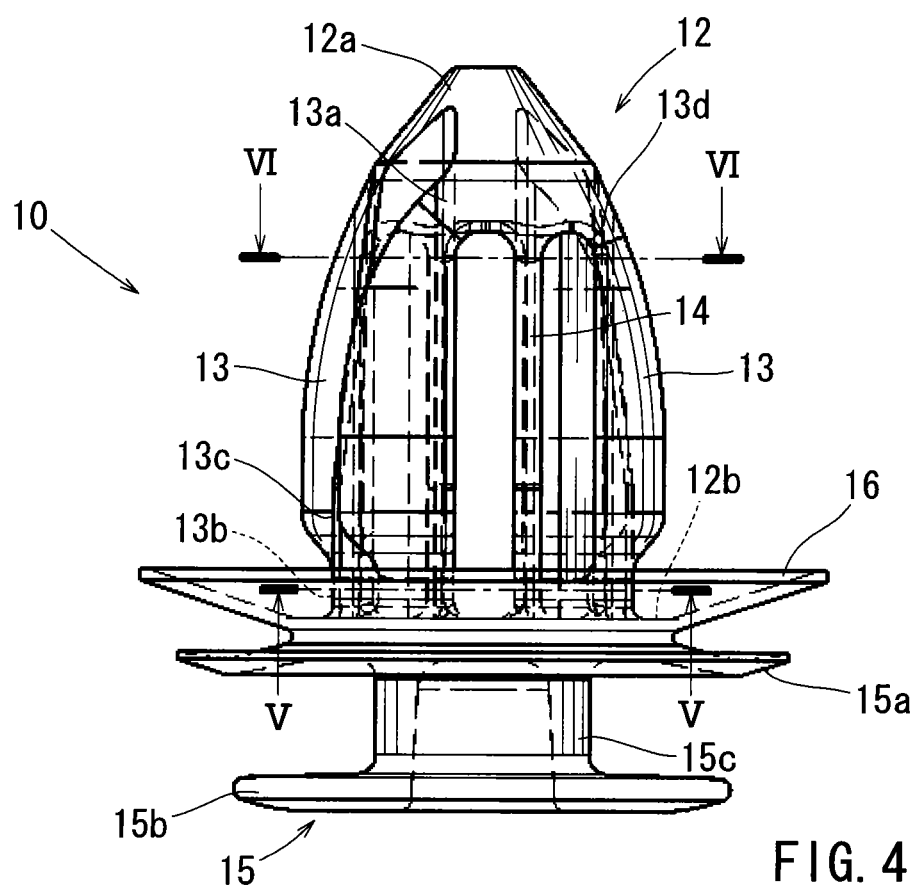
FIG. 4 is an enlarged elevational view of the clip.

As previously described, when the anchor portion 12 is pushed into the insertion hole 22 formed in the subject member 20, the anchor distal end side connecting portion 13a and the anchor proximal end side connecting portion 13b of each of the flexible strips 13 can be substantially uniformly flexed. As a result, each of the flexible strips 13 can be flexed so as to be parallel to the axis of the insertion hole 22 (the longitudinal axis of the anchor portion 12). Therefore, in a last stage of an insertion operation of the clip 10, an angle between the axis of the insertion hole 22 and an outer surface of each of the flexible strips 13 can be maintained in a substantially zero degree (FIG. 3). Thus, an insertion load (insertion resistance) of the clip 10 cannot be increased even in the last stage of the clip insertion operation. As a result, working efficiency of the clip insertion operation cannot be reduced.

Naturally, various changes and modifications may be made to the present invention without departing from the scope of the invention. For example, in the embodiment, the flexible strips 13 are respectively positioned circumferentially at equal intervals. However, the flexible strips 13 can be positioned at unequal intervals, if necessary.

Further, the anchor distal end side connecting portion 13a has the substantially same cross-sectional shape (fan shape) as the anchor proximal end side connecting portion 13b. However, the anchor distal end side connecting portion 13a may have a cross-sectional shape different from the anchor proximal end side connecting portion 13b.

In addition, the shape of each of the support strips 14 is not limited to the L-shape in cross section. Also, the support strips 14 can be asymmetrically positioned. Further, the support strips 14 can be replaced with a single support strip having, for example, a cross shape in cross section.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip, comprising:
   an anchor portion having a plurality of flexible strips and at least one support strip,
   wherein each of the flexible strips is integrally connected to the at least one support strip only via a connecting portion corresponding to a distal end portion of the anchor portion and a connecting portion corresponding to a proximal end portion of the anchor portion, wherein when the anchor portion is pushed into an insertion hole formed in a subject member, the anchor portion is inserted into the insertion hole while each of the flexible strips are flexed toward a longitudinal axis of the anchor portion, so that a shouldered portion of each of the flexible strips can engage a periphery of the insertion hole, and
   wherein each of the flexible strips is formed such that the difference between a junction area of the anchor distal end side connecting portion and a junction area of the anchor proximal end side connecting portion is 0-15% such that the anchor distal end side connecting portion and the anchor proximal end side connecting portion can be substantially uniformly flexed.

2. The clip as defined in claim 1, wherein the flexible strips are respectively positioned circumferentially at equal intervals.

3. The clip as defined in claim 1, wherein the at least one support strip comprises a pair of support strips each having an L-shape in cross section that are positioned so as to be symmetrical about the longitudinal axis of the anchor portion.

4. A clip, comprising:
   an anchor portion having a plurality of flexible strips and at least one support strip,
   wherein each of the flexible strips is integrally connected to the at least one support ship only via a connecting portion corresponding to a distal end portion of the anchor portion and a connecting portion corresponding to a proximal end portion of the anchor portion,
   wherein when the anchor portion is pushed into an insertion hole formed in a subject member, the anchor portion is inserted into the insertion hole while each of the flexible strips are flexed toward a longitudinal axis of the anchor portion, so that a shouldered portion of each of the flexible strips can engage a periphery of the insertion hole,
   wherein each of the flexible strips is formed such that the difference between a junction area of the anchor distal end side connecting portion and a junction area of the anchor proximal end side connecting portion is 0-15% such that the anchor distal end side connecting portion and the anchor proximal end side connecting portion can be substantially uniformly flexed, and
   wherein a most-bulged portion of each of the flexible strips has an outer surface parallel to the longitudinal axis of the anchor portion.

* * * * *